(12) United States Patent
Österling

(10) Patent No.: US 10,440,592 B2
(45) Date of Patent: Oct. 8, 2019

(54) SIGNALING OF BEAM FORMING MEASUREMENTS

(71) Applicant: Telefonaktiebolaget LM Ericsson (publ), Stockholm (SE)

(72) Inventor: Jacob Österling, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/570,867

(22) PCT Filed: Jun. 3, 2015

(86) PCT No.: PCT/SE2015/050644
§ 371 (c)(1),
(2) Date: Oct. 31, 2017

(87) PCT Pub. No.: WO2016/195555
PCT Pub. Date: Dec. 8, 2016

(65) Prior Publication Data
US 2018/0139631 A1    May 17, 2018

(51) Int. Cl.
*G01R 31/08* (2006.01)
*H04W 24/02* (2009.01)
(Continued)

(52) U.S. Cl.
CPC ............ *H04W 24/02* (2013.01); *H04B 7/024* (2013.01); *H04B 7/0617* (2013.01); *H04B 7/0413* (2013.01); *H04W 88/08* (2013.01)

(58) Field of Classification Search
USPC .... 370/328, 329, 338, 231, 252, 310, 310.2, 370/316, 350, 395.4, 436, 470, 474
See application file for complete search history.

(56) References Cited

U.S. PATENT DOCUMENTS 8,229,017 B1 * 7/2012 Lee .................. H04B 7/0665
342/432
9,369,192 B1 * 6/2016 Lee .................. H04B 7/0617
(Continued)

OTHER PUBLICATIONS

International Search Report and Written Opinion dated Jan. 15, 2016, International Patent Application No. PCT/SE2015/050644, 12 pages.
(Continued)

*Primary Examiner* — Phuongchau Ba Nguyen
(74) *Attorney, Agent, or Firm* — Sage Patent Group

(57) ABSTRACT

The solution described herein relates to using excess bandwidth on an interface to send measurement signals without or with limited beam forming in non-real time, i.e. allowing a delay. A Radio Equipment, RE and a method therein is provided. The method comprises receiving information on a plurality of antenna elements; deriving, from the received information, based on at least one beamforming matrix; information received in at least one pay-load beam, and providing the derived information to the REC over the interface. The method further comprises storing part of the received information not comprised in the at least one pay-load beam; and, when there is available capacity on the interface, given the providing of the derived information, at least part of the stored information is provided to the REC over the interface.

14 Claims, 3 Drawing Sheets

(51) Int. Cl.
  *H04B 7/024* (2017.01)
  *H04B 7/06* (2006.01)
  *H04B 7/0413* (2017.01)
  *H04W 88/08* (2009.01)

(56) References Cited

U.S. PATENT DOCUMENTS

| | | | |
|---|---|---|---|
| 2007/0071147 A1* | 3/2007 | Sampath | H04B 7/0404 |
| | | | 375/347 |
| 2009/0238303 A1* | 9/2009 | Mondal | H04B 7/0417 |
| | | | 375/295 |
| 2009/0296788 A1* | 12/2009 | Hottinen | H04B 7/0417 |
| | | | 375/219 |
| 2011/0281585 A1 | 11/2011 | Kwon et al. | |
| 2012/0040706 A1 | 2/2012 | Shin et al. | |
| 2015/0009845 A1 | 1/2015 | Takano | |

OTHER PUBLICATIONS

Huawei, "RAN2 Considerations for Coordinated Multipoint Transmission and Reception," 3GPP TSG-RAN WG2 meeting #66, R2-093107, San Francisco, USA, May 4-8, 2009, 5 pages.
International Search Report and Written Opinion of the International Searching Authority (Corrected Version) PCT/SE2015/050644, dated Dec. 15, 2017, 12 pages.
Communication Under Article 94(3) for European Patent Application No. 15,731,741.3-1220, dated Jan. 28, 2019, 8 Pages.

* cited by examiner

SIGNALING OF BEAM FORMING MEASUREMENTS

CROSS REFERENCE TO RELATED APPLICATIONS

This application is a 35 U.S.C. § 371 national stage application of PCT International Application No. PCT/SE2015/050644 filed on Jun. 3, 2015, the disclosure and content of which is incorporated by reference herein in its entirety.

TECHNICAL FIELD

The invention relates to beam forming in wireless communication systems, and in particular to signaling of uplink, UL, beam forming measurements over an interface.

BACKGROUND

In order to perform beam forming, a plurality of antenna elements are required. The higher frequencies that are used for communication, the more antenna elements, coherently combined, are needed to get a sufficiently large antenna area. One of the problems of having a large number of antenna elements is the handling of all the received data before the necessary combination has been done.

The concept of beam forming is illustrated in a schematic manner in FIG. 1, which shows a network node 101 performing beam forming using an antenna arrangement comprising 8×8 antenna elements. The network node provides a set of wireless devices 101-103 with radio coverage by means of a set of beams 105-107. As illustrated in FIG. 1, there may be wireless devices 108 within an area coverable by the network node, which are not provided with coverage for various reasons.

A transceiver, such as a radio base station, RBS, typically comprises radio equipment, RE and a radio equipment controller, REC, as illustrated in FIG. 2. The antenna elements are comprised in the RE, and received data is conveyed to the REC via an interface, typically having a limited capacity. One way of reducing the large amount of received data is that the radio equipment, RE, of a transceiver performs beam forming and sends only requested data comprised in virtual beams to the UL physical layer processing.

Another alternative is to allocate extra bandwidth, or capacity, to the interface for sending more beams, or less narrow beams, and then do final beam forming in the REC.

If the radio, RE, combines the antenna signals, i.e. performs the beam forming, rays falling outside the beams will not be known to the physical layer processing, and will thus not be asked for. This will reduce how aggressive the beam forming can be, i.e. how narrow beams or how few beams that can be used. Further, allocating extra bandwidth to the interface for extra beams is costly.

Below, a beam forming radio base station, RBS, for which the solution described herein is applicable, will be described.

The RBS comprises two main parts—the Radio Equipment Controller, REC, and the Radio Equipment, RE, as illustrated in FIG. 2. Although these terms are derived from the Common Public Radio Interface, CPRI, specification, the functional allocation of the RBS described here is somewhat different as compared to what is described in the CPRI specification. Some differences are that:

The REC does not send antenna streams to the RE, but rather MIMO streams, or virtual antenna streams. In CPRI, the REC can directly address the RE antennas, but in this beam forming RBS, the RE includes the functionality of mapping a MIMO stream to a set of physical antennas in order to generate a wanted beam form. Sometimes, this is called virtual antenna ports, and may be regarded as that the RE presents a set of virtual antenna patterns of which the REC can chose from. The REC thus sends the RE a data stream and information on what virtual antenna to output it on. This can be different for different simultaneous UEs, and different for UL and DL.

To have an efficient simultaneous multi user beam forming, the FFT and IFFT functions are moved to the RE. In addition, the beam forming functionality is added to the RE.

The REC-RE interface is typically no longer a streaming interface, but packet oriented, sending the (frequency domain) samples to the RE symbol by symbol. This allows for quick and flexible allocation of resources on the interface to different users. This is not a necessity, but at least the beam forming information is packet based.

The REC still maintain the knowledge about the mobile users, such as data channel, beam direction, etc, and the RE acts solely on commands from the REC.

If considering a system with 400 MHz air interface band width, support for 4 MIMO streams and utilizing 64 antennas for beam forming:

A CPRI realization of this system exposing all 64 antennas for the REC would require approximately 64 CPRI interfaces of 10 Gbps, since a CPRI interface carries about 400 MHz. Further, an interface using virtual antenna ports would require 4 MIMO streams of 400 MHz, and would thus require about 4 interfaces of 10 Gbps, since one 10 Gbps interface still carries data for about 400 MHz.

SUMMARY

The solution described herein relates to using excess bandwidth, i.e. resources, on the REC-RE interface to send measurement signals without or with limited beam forming in non-real time, i.e. allowing a delay. In systems applying FDD, extra bandwidth can be made available by not scheduling the full air bandwidth, or not scheduling all beams. In systems applying TDD, excess bandwidth will be available in the DL subframes. According to the solution, the RE stores additional data samples from the antenna elements and sends them when the interface is empty. This does not improve the current reception, but will provide better information to the next UL subframe. The solution provides a very robust way of searching for rays from wireless devices.

According to a first aspect, a method is provided, which is to be performed by a Radio Equipment, RE, operable to be connected to a Radio Equipment Controller, REC, via an interface. The method comprises receiving information on a plurality of antenna elements; deriving, from the received information, based on at least one beamforming matrix; information received in at least one pay-load beam, and providing the derived information to the REC over the interface. The method further comprises storing part of the received information not comprised in the at least one pay-load beam; and, when there is available capacity on the interface, given the providing of the derived information, at least part of the stored information is provided to the REC over the interface.

According to a second aspect, a Radio Equipment, RE, is provided, which is operable to be connected to a Radio Equipment Controller, REC, via an interface. The RE is configured to receive information on a plurality of antenna elements; to derive, from the received information, based on at least one beamforming matrix, information received in at least one pay-load beam, and to provide the derived information to the REC over the interface. The RE is further configured to store part of the received information, which was not comprised in the at least one pay-load beam; and to, when there is available capacity on the interface given the providing of the derived information; to provide at least part of the stored information to the REC over the interface.

According to a third aspect, a network node, such as a radio base station is provided, comprising an RE according to the second aspect.

According to a fourth aspect, a computer program is provided, which comprises instructions which, when executed on at least one processor, cause the at least one processor to carry out the method according to the first aspect.

According to a fifth aspect, a carrier is provided, containing the computer program of the fourth aspect, wherein the carrier is one of an electronic signal, optical signal, radio signal, or computer readable storage medium.

BRIEF DESCRIPTION OF DRAWINGS

The foregoing and other objects, features, and advantages of the technology disclosed herein will be apparent from the following more particular description of embodiments as illustrated in the accompanying drawings. The drawings are not necessarily to scale, emphasis instead being placed upon illustrating the principles of the technology disclosed herein.

DETAILED DESCRIPTION

The solution described herein relates to creating of two different types of communication, or data transfer, over the interface between RE and REC. The different types of communication may also, themselves, be referred to as different interfaces or communication modes or protocols between the RE and the REC. If referring to the different types of communication as "modes", a first mode relates to providing or delivery of the data streams used in the physical layer processing of the UL transmission, and a second mode relates to the providing or delivery of complementary measurement data e.g. for aiding the beam selection for later UL transmissions from the same UE.

Both modes may be implemented using a command-response concept: The REC may order a virtual antenna received signal (pay-load signal), and/or a measurement signal, and the RE may send the resulting data back to the REC. The modes may differ in the kind of commands given, and in the priority of the transmission of the data back to the REC:

For the first mode, related to the data streams, e.g. pay-load, the REC may order the reception of a set of virtual antennas, e.g. as "send me the complete air interface bandwidth, using 4 beams facing at 7, 24, 33 and 37 degrees, as narrow as you can" (1 dimension for simplicity in description). The RE will then combine the received signal from the physical antennas in accordance to the command and send the samples to the REC.

For the second mode, related to measurement signals, the REC may have two commands: one to clear measurement buffers and another to order new measurement samples. The measurement samples can be ordered according to a virtual beam and for a duration of time. A typical case may be to order many (or all) antennas (no beam forming) for one symbol.

The RE output towards the RE-REC interface may be constructed as a two-priority level buffer system, where:
Priority 1 is the UL data streams.
Priority 2 is the UL measurement streams.

The priority 2 queue is to be sent "when capacity is available", which means that there are resources which are not used for conveying priority 1 queue data.

The solution described herein will mainly be described in a context of an LTE network, using LTE, or E-UTRAN, terminology. However, the solution may also be applicable for other radio access networks applying similar solutions for beam forming.

Exemplifying Embodiments

Below, exemplifying method embodiments performed by a Radio Equipment, here denoted RE, will be described with reference to FIG. 3. The RE is operable to be connected to a Radio Equipment Controller, REC, via an interface. The interface may be assumed to have a limited capacity. The RE may be assumed to comprise or be connected to a plurality of antenna elements. Embodiments of the RE will be described further below.

Figure 1:
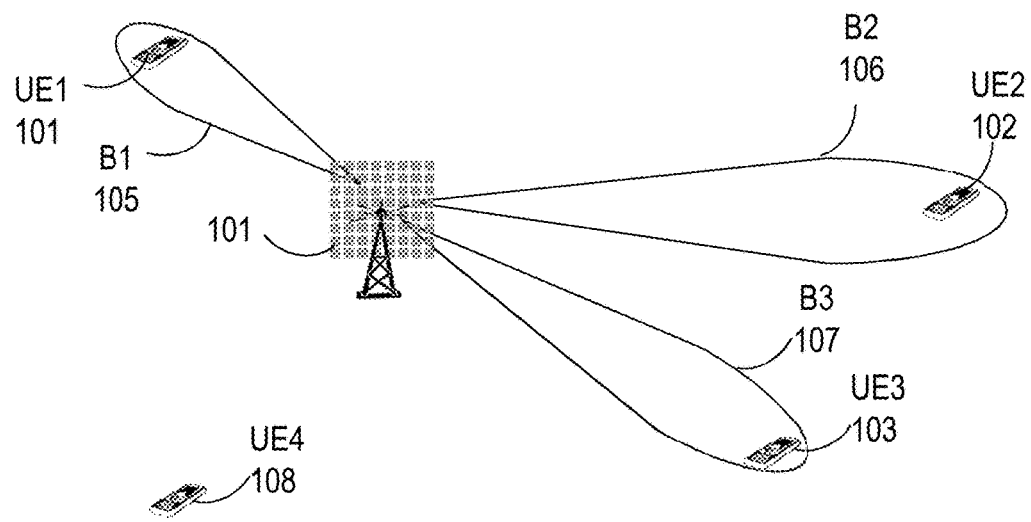
FIG. 1 shows an exemplifying beam forming scenario in a wireless communication system.
Figure 2:
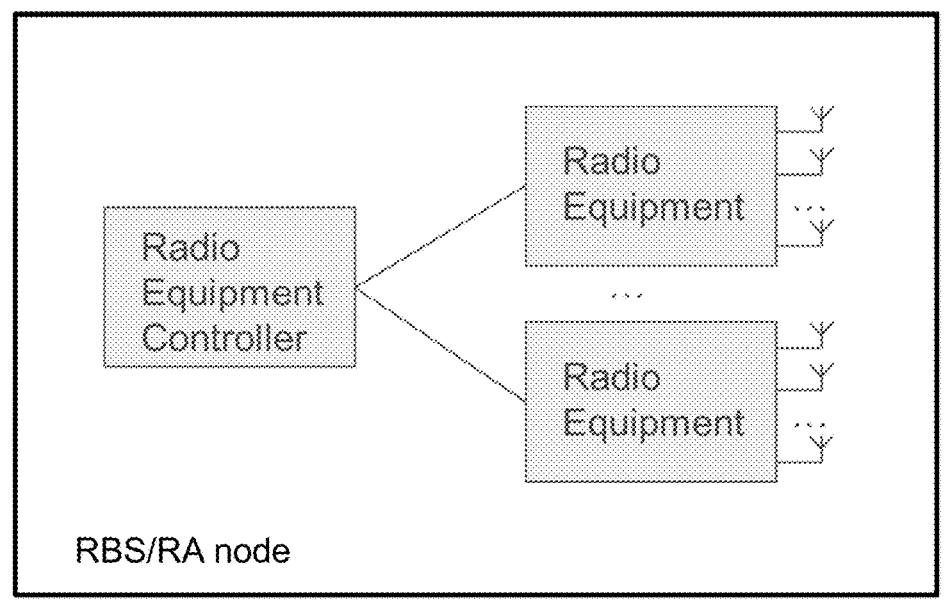
FIG. 2 illustrates a network node comprising Radio Equipment, RE, and Radio Equipment Controller, REC, according to the prior art.
Figure 3:
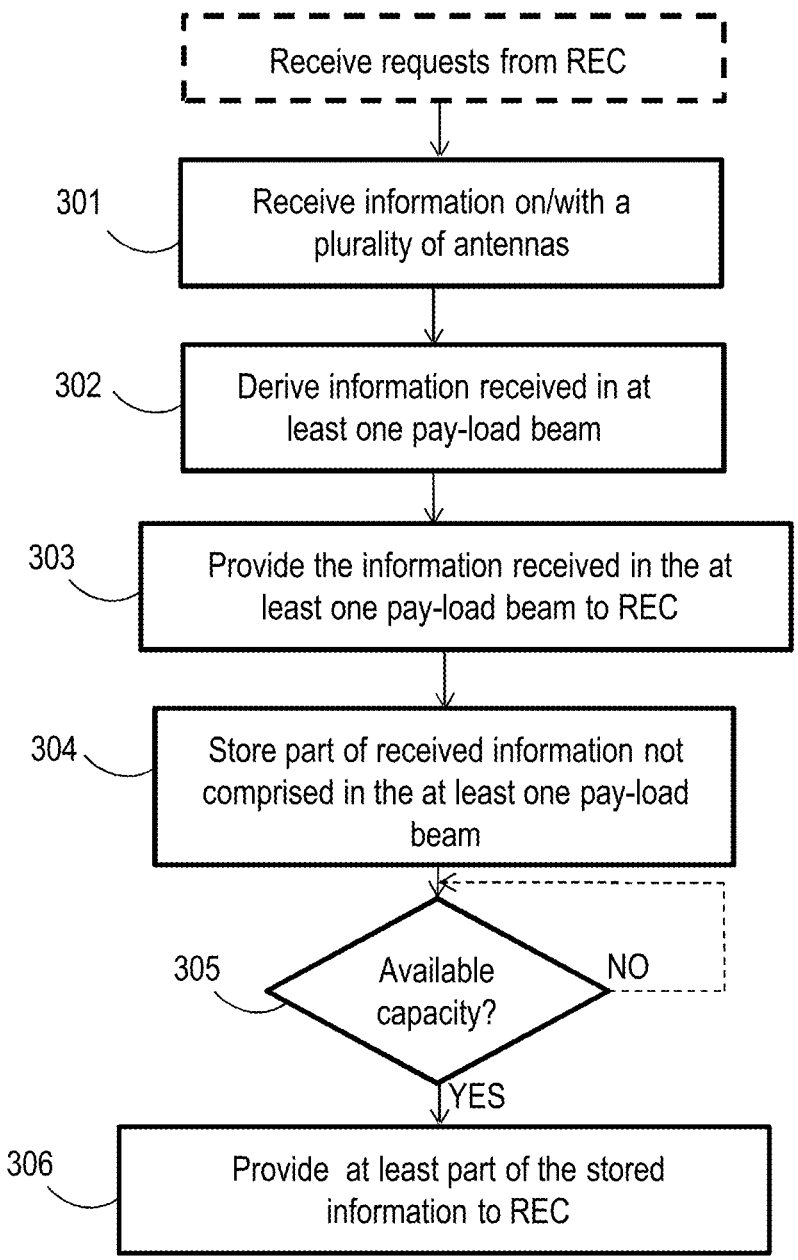
FIG. 3 shows a method to be performed by a RE, according to an exemplifying embodiment.

The method illustrated in FIG. 3 is to be performed by the RE when being connected to a REC in a wireless communication network supporting beam forming. Both the RE and the REC may be part of a network node, such as a radio base station or other type of radio access, RA, node. The RE, REC and network node may be assumed to support digital beamforming.

The method in FIG. 3 comprises receiving 301 information on (with) a plurality of antenna elements. The method further comprises deriving 302, from the received information, information received in at least one pay-load beam. This information is derived based on at least one beamforming matrix, which may have been provided to the RE by the REC. This derived information is then provided 303 to the REC over the interface. The method further comprises storing 304 part of the received information, not comprised in the at least one pay-load beam; and, when there is available capacity 305 on the interface, at least part of the stored information is provided 306 to the REC over the interface.

The above method enables delivery of additional data, i.e. in addition to data associated with pay-load beams, to the REC, which data would otherwise typically have been discarded. This will be explained in more detail below.

The information received by use of the plurality of antenna elements could be referred to as a set of total received information, which is not yet processed in terms of beam forming and linear combining. Typically, all antenna elements would be used for receiving this set of information. This set could be described as comprising information from "all" possible directions, given the number of antenna elements. From this set, information e.g. from directions of interest could be derived, i.e. extracted, by means of digital beam forming.

By "pay-load beam" is herein referred to an antenna beam of which samples are used by the signal processing of the node to decode user transmitted data for interpretation and potential forwarding to a core network, or corresponding. This could be described as a beam serving a wireless device in the uplink. Here, pay-load beam is defined in uplink, UL, terms, since in the context of the solution described herein, the focus is on beams for receiving information. The term pay-load beam is intended to also cover beams used for Random Access RA, even though no actual pay-load is associated with RA.

The information received in the at least one pay-load beam is related to ongoing interaction or communication with wireless devices and is therefore of high priority for the wireless network, and thus for the RE and REC. Therefore, this information, when derived, is to be provided to the REC with as little delay as possible. Therefore, the information related to the at least one pay-load beam should have guaranteed access to the resources of the RE-REC interface, i.e. the link from the RE to the REC. This could be described as that the information related to the at least one pay-load beam has a highest priority to resources on the interface, and will be assigned these resources. It should be noted that this information is typically not stored in the RE before being provided to the REC, since storing implies delay.

However, there may be other information that is of interest, in addition to what is received in the at least one pay load beam. For example, a served wireless device may have moved more than expected, or a new wireless device may have been switched on somewhere within the area coverable by signals from the antenna elements associated with the RE. Such information will herein be referred to e.g. as additional information, extra information or measurement information or signals. Access to such additional information enables the wireless network to perform some surveillance of what is going on apart from the known pay-load beam related activities, and thereby e.g. detect important events. It is such additional information that is referred to in the method described above and illustrated in FIG. 3, when stating that part of the received information not comprised in the at least one pay-load beam is stored. Further, it is stated above that at least part of the stored information should be provided to the REC when there is "available capacity" on the interface. By "available capacity" is here meant resources which are not occupied by information related to pay-load beams. Such available, or "residual" capacity may be used for providing parts, e.g. small portions, of the stored information. In a scenario with unlimited resources on the RE-REC interface, all information could be conveyed over the interface without problems, and no information would need to be stored in the RE for later delivery. Further, if the REC itself also would have unlimited processing capacity, no beamforming would need to be performed by the RE, and all information received on all antenna elements could be provided to the REC over the interface in real-time for further processing. However, this is not a realistic scenario for various reasons, e.g. since capacity has a price.

The inventor has realized that even when the capacity of the RE-REC interface is very restricted, at least some additional information may still be derived by the RE and be provided to the network. This is achieved by storing the additional information in the RE and allowing a delay for delivery of this information, which is not allowed for information related to pay-load beams. By allowing a delay, at least small amounts of additional information could be provided in whatever excess capacity that is left after allocation of resources for pay-load beam information. For example, at least part of the stored information may be provided to the REC after a time period, which is longer than a maximum allowed delay associated with the pay-load beam information. An exemplifying allowed delay for the additional information could be in the order of e.g. 1 ms, while information related to pay-load beams are not allowed to be delayed more than in the order of e.g. 20 µs.

The additional information is captured simultaneously, using at least partly the same antenna elements, as information related to pay-load beams. In an exemplifying embodiment, all antenna elements are used for receiving both the information related to pay-load beams and additional information. The "pay-load information" and the additional information may be regarded as subsets selected from the total set of information received on the plurality of antenna elements e.g. at a point in time.

The information related to pay-load beams may be derived upon a request from the REC. Such a request would then be associated with at least one beamforming matrix defining the pay-load beams. The additional information could be requested in a similar manner by the REC, e.g. be derived based on at least one (other) beamforming matrix provided by the REC. A request for additional information could further or alternatively be associated with a time period, as previously mentioned, such that small amounts of information from a plurality of directions and/or antenna elements may be stored. At least when digital beam forming is used for deriving the additional information, this information may be described as being related to other spatial directions than the spatial directions represented by the pay-load beams. An exemplifying case where no beam forming is performed in order to derive the additional information is when one symbol, e.g. OFDM symbol, is derived from all (or almost all) antenna elements, and this information is stored for delayed delivery.

In case of radio communication based on Frequency Division Duplex, FDD, one set of frequency bands will be dedicated for uplink communication. Thus, in case of FDD, the additional information would need to be provided to the REC in whatever resources that are left on the RE-REC interface after the prioritized allocation of resources for conveying of the information related to pay-load beams. This could be e.g. a few percent of the resources. The REC could, at least temporary, increase the amount of resources available for providing of additional information e.g. by restricting the scheduling of wireless devices served by pay-load beams, which would entail less information related to pay-load beams. Thus, for an FDD system, the REC could decide to schedule less data in the UL if it needs more measurement data.

In case of radio communication based on Time Division Duplex, however, there will be subframes or time slots dedicated for downlink communication, where no information is received by the antenna elements. As realized by the inventor, at least parts of stored additional information could then be provided from the RE to the REC over the RE-REC interface during such time slots, since no pay-load related information is to be provided to the REC during these slots. Thus, in a TDD system, there will be plenty of "available capacity" on the RE-REC interface for sending stored additional data, as the majority of subframes normally are DL.

As realized by the inventor, in practice, the UL is seldom very loaded, and many systems apply TDD type communication. This means that there will almost always be space on the interface for at least some measurement samples. When the full air bandwidth is used, a mechanism to reduce the number of measurements samples (or even suppress them) is needed. This solution described herein allows for this in an autonomous way. For example, a TDD beam forming radio equipment could be configured to send, e.g. to a radio equipment controller, non-beam formed received UL data during DL subframes, according to an exemplifying embodiment.

The hierarchical access to interface resources could be formalized e.g. by assigning different priority levels to the information itself and/or the communication of the different types of information, as previously mentioned. Then, a lower priority would be assigned to a communication of the stored information than to a communication of information associated with pay-load beams. Thereby, the stored information would be provided only when (and if) there were resources on the RE-REC interface that were not occupied by transfer of pay-load related information. The stored information could be discarded if not having been delivered within a configurable time period. Further, the information having a lower priority could also be disregarded by the REC in case of overload situations where all information/data provided by the RE cannot be handled. The additional information could be discarded based on a priority indication by potential intermediate nodes when necessary, e.g. for reasons of lack of capacity.

Exemplifying embodiments could be described as enabling and/or providing a control interface to a radio part of a network node, such as an RE, where received data may be requested using two priority levels: One level for user data and one level for measurement data.

Hardware Implementations

The methods and techniques described above may be implemented in radio equipment, RE. The RE may be comprised e.g. in a network node operable in a wireless communication network, such as an eNB operable in an LTE type network.

Figure 4A:
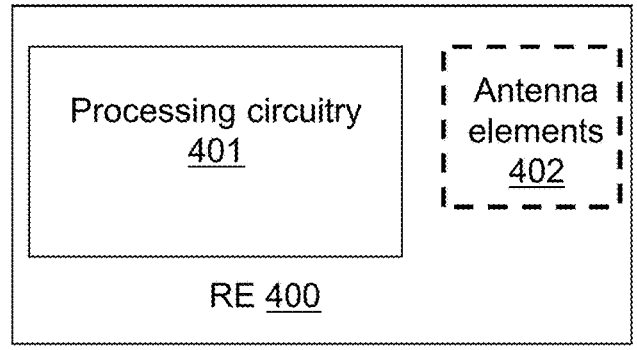
FIGS. 4a-4c illustrate implementations of a RE according to exemplifying embodiments.
Figure 4B:
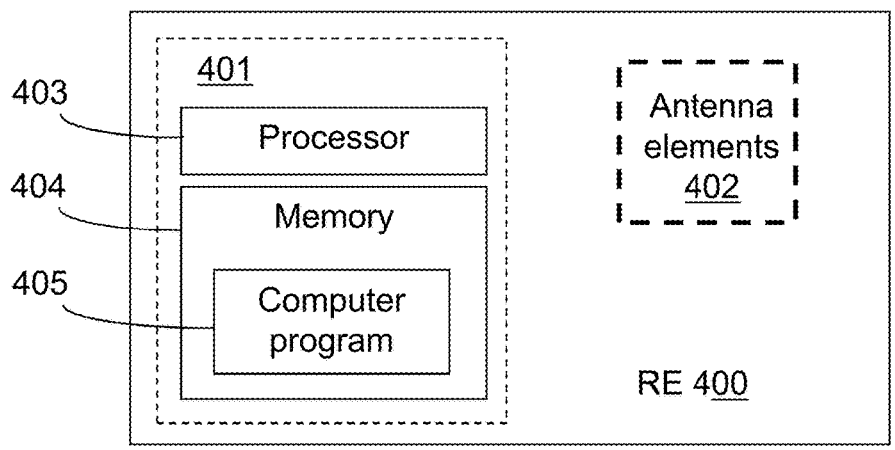
Figure 4C:
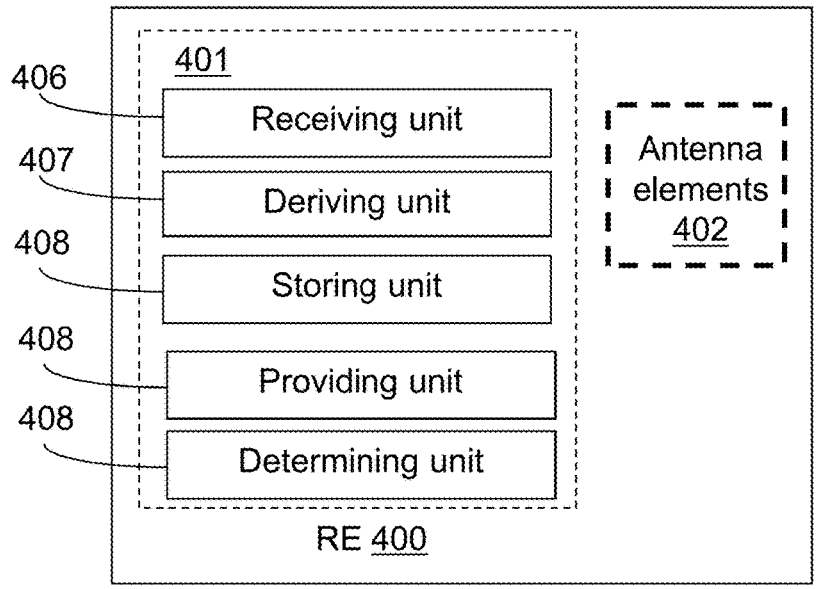

Radio Equipment, RE, FIGS. 4a-4c

An exemplifying embodiment of a RE is illustrated in a general manner in FIG. 4a. The RE may, as previously described, be an eNB operable in an LTE type network. The RE 400 is configured to perform at least one of the method embodiments described above with reference e.g. to FIG. 4. The RE 400 is operable to be connected to a REC via an interface, which may alternatively be denoted e.g. RE-REC interface, link or connection. The RE comprises or is operable to be connected to a plurality of antenna elements, on which radio signals may be transmitted and received. The RE is associated with the same technical features, objects and advantages as the previously described method embodiments. The node will be described in brief in order to avoid unnecessary repetition.

The RE may be implemented and/or described as follows: The RE 400 is configured for supporting digital beamforming. The RE 400 comprises processing circuitry 401 and possibly antenna elements 402. When the RE does not comprise antenna elements, the "antenna elements" 402 will instead be e.g. an I/O interface towards external antenna elements. Note that this interface 402 is not the interface discussed in the rest of this disclosure. The processing circuitry 401 is configured to cause the RE 400 to receive information on a plurality of antenna elements, e.g. all antenna elements comprised in or connected to the RE. The processing circuitry 401 is further configured to cause the RE to derive, from the received information, e.g. based on at least one beamforming matrix; information received in at least one pay-load beam, and to provide the derived information to the REC over the interface (RE-REC interface) The processing circuitry 401 is further configured to cause the RE to store part of the received information not comprised in the at least one pay-load beam; and to provide at least part of the stored information to the REC over the RE-REC interface when there is available capacity on the interface, given the providing of the derived information.

The RE is thereby configured for and operable to enable the REC to access additional information, e.g. selected by the REC, even though the capacity over the RE-REC interface is not sufficient for carrying both the additional information and the information related to pay-load beams in real time.

The processing circuitry 401 could, as illustrated in FIG. 4b, comprise processing means, such as a processor 403, e.g. a CPU, and a memory 404 for storing or holding instructions. The memory would then comprise instructions, e.g. in form of a computer program 405, which when executed by the processing means 403 causes the RE 400 to perform the actions described above.

An alternative implementation of the processing circuitry 401 is shown in FIG. 4c. The processing circuitry here comprises a receiving unit 406, configured to cause the RE to receive information on a plurality of antenna elements. The processing circuitry further comprises a deriving unit 407, configured to cause the RE to derive, from the received information, e.g. based on at least one beamforming matrix; information received in at least one pay-load beam. The processing circuitry further comprises a providing unit 408, configured to cause the RE to provide the derived information to the REC over the interface. The processing circuitry further comprises a storing unit 409, configured to store part of the received information not comprised in the at least one pay-load beam. The providing unit 408 is further configured to provide at least part of the stored information to the REC over the RE-REC interface, when there is available capacity on the interface, given the providing of the derived information The REs described above could be configured for the different method embodiments described herein, such as receiving requests from the REC and/or assigning different priority levels to a communication of the information related to pay-load beams and a communication of part of the stored additional information.

The RE 400 may be assumed to comprise further functionality when needed, e.g. for carrying out regular RE functions.

The solution described herein also relates to a computer program product comprising computer readable means. On this computer readable means a computer program can be stored, which computer program can cause a processor to execute a method according to embodiments described herein. The computer program product may be an optical disc, such as a CD (compact disc) or a DVD (digital versatile disc) or a Blu-Ray disc. As explained above, the computer program product could also be embodied in a memory of a device, such as the computer program product 404 of FIG. 4b. The computer program can be stored in any way which is suitable for the computer program product. The computer program product may be a removable solid state memory, e.g. a Universal Serial Bus (USB) stick.

The solution described herein further relates to a carrier containing a computer program, which when executed on at least one processor, cause the at least one processor to carry out the method according e.g. to an embodiment described herein. The carrier may be e.g. one of an electronic signal, an optical signal, a radio signal, or computer readable storage medium.

The steps, functions, procedures, modules, units and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules, units and/or blocks described above may be implemented in software such as a computer program for execution by suitable processing circuitry including one or more processing units. The software could be carried by a carrier, such as an electronic signal, an optical signal, a radio signal, or a computer readable storage medium before and/or during the use of the computer program in the network nodes. The network node and/or network control node described above may be implemented in a so-called cloud solution, referring to that the implementation may be distributed, and the network node and network control node therefore may be so-called virtual nodes or virtual machines.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors, DSPs, one or more Central Processing Units, CPUs, and/or any suitable programmable logic circuitry such as one or more Field Programmable Gate Arrays, FPGAs, or one or more Programmable Logic Controllers, PLCs. That is, the units or modules in the arrangements in the different nodes described above could be implemented by a combination of analog and digital circuits, and/or one or more processors configured with software and/or firmware, e.g. stored in a memory. One or more of these processors, as well as the other digital hardware, may be included in a single application-specific integrated circuitry, ASIC, or several processors and various digital hardware may be distributed among several separate components, whether individually packaged or assembled into a system-on-a-chip, SoC.

It should also be understood that it may be possible to re-use the general processing capabilities of any conventional device or unit in which the proposed technology is implemented. It may also be possible to re-use existing software, e.g. by reprogramming of the existing software or by adding new software components.

The embodiments described above are merely given as examples, and it should be understood that the proposed technology is not limited thereto. It will be understood by those skilled in the art that various modifications, combinations and changes may be made to the embodiments without departing from the present scope. In particular, different part solutions in the different embodiments can be combined in other configurations, where technically possible.

It should be noted that although terminology from 3GPP LTE has been used in this disclosure to exemplify the invention, this should not be seen as limiting the scope of the invention to only the aforementioned system. Other wireless systems which support a broadcast service may also benefit from exploiting the ideas covered within this disclosure.

When using the word "comprise" or "comprising" it shall be interpreted as non-limiting, i.e. meaning "consist at least of".

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

ABBREVIATIONS

REC Radio Equipment Control, "DUS"
RE Radio Equipment, "RRU"
The invention claimed is:
1. A Radio Base Station (RBS) comprising a Radio Equipment (RE) and a Radio Equipment Controller (REC), the Radio Equipment (RE) operable to be connected to the Radio Equipment Controller (REC) via an interface, and the Radio Equipment (RE) being configured to perform a method comprising:
  receiving information on a plurality of antenna elements;
  deriving, from the received information, based on at least one beamforming matrix, information received in at least one pay-load beam;
  providing the derived information to the REC over the interface;
  storing, by the RE until allocation of resources for the at least one pay-load beam, a part of the information that is received on the plurality of antenna elements that is not comprised in the at least one pay-load beam, wherein the part of the information comprises additional information including measurement information which enables performing surveillance of activities apart from pay-load beam related activities, and thereby detecting important events; and
  when there is available capacity on the interface given the providing of the derived information, providing at least part of the stored information to the REC over the interface.
2. The method according to claim 1, wherein at least one of the plurality of antenna elements is used to simultaneously receive both the information related to the at least one pay-load beam and the information to be stored.

3. The method according to claim 1, wherein the stored information is provided to the REC in interface resources not occupied by communication related to pay-load beams.

4. The method according to claim 1, wherein, in case of time division duplex (TDD), the stored information is provided to the REC during time segments associated with downlink communication.

5. The method according to claim 1, further comprising assigning a lower priority to a communication of the stored information than to a communication of information associated with pay-load beams.

6. The method according to claim 1, wherein at least part of the stored information is provided to the REC after a time period, which is longer than a maximum allowed delay associated with the information associated with pay-load beams.

7. A Radio Base Station (RBS) comprising a Radio Equipment (RE) and a Radio Equipment Controller (REC), the Radio Equipment (RE) operable to be connected to the Radio Equipment Controller (REC) via an interface, the RE being configured to:
   receive information on a plurality of antenna elements;
   derive, from the received information, based on at least one beamforming matrix, information received in at least one pay-load beam;
   provide the derived information to the REC over the interface;
   store, by the RE until allocation of resources for the at least one pay-load beam, a part of the information that is received on the plurality of antenna elements that is not comprised in the at least one pay-load beam, wherein the part of the information comprises additional information including measurement information which enables performing surveillance of activities apart from pay-load beam related activities, and thereby detecting important events; and
   when there is available capacity on the interface given the providing of the derived information, provide at least part of the stored information to the REC over the interface.

8. The RE according to claim 7, being configured to use at least one of the plurality of antenna elements to receive both information related to the at least one pay-load beam and information to be stored.

9. The RE according to claim 7, being configured to provide the stored information to the REC in interface resources not occupied by communication related to pay-load beams.

10. The RE according to claim 7, being configured to, in case of TDD, provide the stored information to the REC during time segments associated with downlink communication.

11. The RE according to claim 7, being configured to assign a lower priority to a communication of the stored information than to a communication of information associated with pay-load beams.

12. The RE according to claim 7, being configured to provide at least part of the stored information to the REC after a time period, which is longer than a maximum allowed delay associated with the information associated with pay-load beams.

13. A network node comprising a Radio Equipment (RE) according to claim 7.

14. Computer program, comprising instructions which, when executed on at least one processor, cause the at least one processor to carry out the method according to claim 1.

* * * * *